US 11,645,255 B2

United States Patent
Lin et al.

(10) Patent No.: US 11,645,255 B2
(45) Date of Patent: May 9, 2023

(54) METHOD, ELECTRONIC DEVICE, AND COMPUTER PROGRAM PRODUCT FOR STORING AND SEARCHING FOR DATA

(71) Applicant: EMC IP Holding Company LLC, Hopkinton, MA (US)

(72) Inventors: Zhenzhen Lin, Shanghai (CN); Si Chen, Shanghai (CN); Qiang Chen, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

(21) Appl. No.: 17/224,189

(22) Filed: Apr. 7, 2021

(65) Prior Publication Data
US 2022/0292068 A1    Sep. 15, 2022

(30) Foreign Application Priority Data
Mar. 15, 2021 (CN) .......................... 202110275311.9

(51) Int. Cl.
*G06F 16/22* (2019.01)
*G06F 16/245* (2019.01)

(52) U.S. Cl.
CPC ........ *G06F 16/2255* (2019.01); *G06F 16/245* (2019.01)

(58) Field of Classification Search
CPC ........................... G06F 16/2255; G06F 16/245
See application file for complete search history.

(56) References Cited

U.S. PATENT DOCUMENTS

| | | | | |
|---|---|---|---|---|
| 9,733,863 | B1* | 8/2017 | Dai | G06F 3/0683 |
| 11,323,312 | B1* | 5/2022 | Banka | H04L 43/10 |
| 2017/0109247 | A1* | 4/2017 | Nakajima | G06F 11/2069 |
| 2017/0177266 | A1* | 6/2017 | Doerner | G06F 3/0689 |
| 2019/0045005 | A1* | 2/2019 | Verrall | H04L 67/1095 |
| 2019/0079869 | A1* | 3/2019 | Baldi | G06F 12/0817 |
| 2019/0158370 | A1* | 5/2019 | You | H04L 67/303 |
| 2020/0195716 | A1* | 6/2020 | Allsbrook | H04L 67/34 |
| 2021/0011649 | A1* | 1/2021 | Doshi | G06F 3/0604 |
| 2021/0021361 | A1* | 1/2021 | Allsbrook | H04J 3/0638 |
| 2021/0125083 | A1* | 4/2021 | Ogawa | G06N 20/00 |
| 2021/0141770 | A1* | 5/2021 | Wang | G06F 16/185 |
| 2021/0144517 | A1* | 5/2021 | Guim Bernat | H04L 47/781 |

(Continued)

OTHER PUBLICATIONS

Wikipedia, "Internet of Vehicles," https://en.wikipedia.org/w/index.php?title=Internet_of_vehicles&oldid=998331798, Jan. 4, 2021, 3 pages.

(Continued)

*Primary Examiner* — Alicia M Willoughby
(74) *Attorney, Agent, or Firm* — Ryan, Mason & Lewis, LLP

(57) ABSTRACT

The present disclosure provides a method for storing data, including: storing data in a first node, the first node being selected from a first node set including a first edge node and child nodes thereof; selecting, from a second node set including a second edge node and child nodes thereof, a second node for storing the data, the first edge node being a child node of the second edge node; and storing the data in the second node. The present disclosure further provides a method for searching for data. The present disclosure can reduce the time for searching for data in a distributed storage system.

20 Claims, 9 Drawing Sheets

(56) References Cited

U.S. PATENT DOCUMENTS

| | | | |
|---|---|---|---|
| 2021/0208987 A1* | 7/2021 | Hao | G06F 3/0647 |
| 2021/0307089 A1* | 9/2021 | Kim | H04W 4/50 |
| 2022/0129468 A1* | 4/2022 | Su | G06F 16/2255 |
| 2022/0137876 A1* | 5/2022 | Chung | H04L 63/20 |
| | | | 711/154 |
| 2022/0141041 A1* | 5/2022 | Parikh | H04L 9/3066 |
| | | | 713/156 |
| 2022/0329650 A1* | 10/2022 | Zhang | H04L 67/1001 |
| 2022/0353732 A1* | 11/2022 | Filippou | H04W 28/0284 |

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.

M. J. Freedman et al., "Sloppy Hashing and Self-Organizing Clusters," International Workshop on Peer-to-Peer Systems, 2003, 6 pages.

U.S. Appl. No. 16/795,766 filed in the name of Ruixue Zhang et al. filed Feb. 20, 2020, and entitled "Methods, Devices and Computer Program Products for Storing and Accessing Data."

U.S. Appl. No. 16/804,175 filed in the name of Pengfei Wu et al. filed Feb. 28, 2020, and entitled "Method, Device, and Product for Managing Application Nodes in a Distributed Application System."

U.S. Appl. No. 16/806,550 filed in the name of Zhenzhen Lin et al. filed Mar. 2, 2020, and entitled "Method, Electronic Device and Computer Program Product for Storing and Accessing Data."

U.S. Appl. No. 17/182,442 filed in the name of Qiang Chen et al. filed Feb. 23, 2021, and entitled "Method, Electronic Device, and Computer Program Product for Data Transmission."

* cited by examiner

METHOD, ELECTRONIC DEVICE, AND COMPUTER PROGRAM PRODUCT FOR STORING AND SEARCHING FOR DATA

RELATED APPLICATION(S)

The present application claims priority to Chinese Patent Application No. 202110275311.9, filed Mar. 15, 2021, and entitled "Method, Electronic Device, and Computer Program Product for Storing and Searching for Data," which is incorporated by reference herein in its entirety.

FIELD

Embodiments of the present disclosure relate to the field of computers and, more particularly, to a method for storing data, a method for searching for data, an electronic device, a non-transitory computer storage medium, and a computer program product.

BACKGROUND

Currently, more and more clouds, edge nodes, and a large number of client terminals participate in 5G networks and edge computing in the form of nodes. They are connected together to form a distributed storage system to provide users with data having high throughput and high availability.

Regrettably, all nodes in an existing distributed storage system based on edge computing are organized in a decentralized mode. Therefore, as more and more nodes participate therein, a lookup mechanism for stored data (such as a distributed hash table) needs to traverse a longer search path or go through more hops to find metadata of the data, resulting in a decrease in performance of the distributed storage system. In addition, an existing distributed storage system processes data equally without taking node heterogeneity into account, and fails to make full use of computing resources of high-performance devices, which also leads to limitations in the overall performance of the system.

SUMMARY

Illustrative embodiments of the present disclosure provide a solution for storing and searching for data.

According to a first aspect of the present disclosure, a method for storing data is provided, including: storing data in a first node, wherein the first node is selected from a first node set including a first edge node and child nodes thereof; selecting, from a second node set including a second edge node and child nodes thereof, a second node for storing the data, wherein the first edge node is a child node of the second edge node; and storing the data in the second node.

According to a second aspect of the present disclosure, a method for searching for data is provided, including: using a hash value of the data to search a first node set including a first edge node and child nodes thereof for the data; and in response to a failure in finding the data in the first node set, using the hash value of the data to search a second node set including a second edge node and child nodes thereof for the data, wherein the first edge node is a child node of the second edge node.

According to a third aspect of the present disclosure, an electronic device is provided, including: at least one processing unit; and at least one memory that is coupled to the at least one processing unit and stores instructions for execution by the at least one processing unit, wherein the instructions, when executed by the at least one processing unit, cause the electronic device to perform the method according to any one of the first and second aspects of the present disclosure.

According to a fourth aspect of the present disclosure, a non-transitory computer storage medium is provided, including machine-executable instructions that, when executed by a device, cause the device to perform the method according to any one of the first and second aspects of the present disclosure.

According to a fifth aspect of the present disclosure, a computer program product is also provided, including machine-executable instructions that, when executed by a device, cause the device to perform the method according to any one of the first and second aspects of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by the following description of example embodiments of the present disclosure, with reference to the accompanying drawings, and in the example embodiments of the present disclosure, the same reference numerals generally represent the same components.

DETAILED DESCRIPTION

Illustrative embodiments of the present disclosure will be described in more detail below with reference to the accompanying drawings. While the illustrative embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first," "second," and the like may refer to different or identical objects. Other explicit and implicit definitions may also be included below.

As mentioned above, all nodes in a distributed storage system based on edge computing are generally organized in a decentralized mode. When a client terminal requests to access application data, it is first necessary to find metadata of the application data in a distributed hash table of the distributed storage system to locate the data. However, the request for searching for the metadata will be forwarded multiple times in decentralized global nodes to obtain the metadata indicating the storage location of the application data. Moreover, quite a few nodes in the global nodes are unstable, and further it takes a long time to obtain the metadata, or even the metadata cannot be obtained, thereby resulting in a decrease in performance of the system.

On the other hand, such a distributed storage system ignores node heterogeneity, and equally processes all nodes and assigns data storage tasks to the nodes. As a result, some nodes with weak performance (for example, user terminal devices) do not have enough storage space to store data or have stored hot spot data, which also leads to a decrease in overall performance of the system.

In view of this, various embodiments of the present disclosure are provided to solve or at least alleviate the above-mentioned problems. Various embodiments of the present disclosure use a topological relationship among nodes in a distributed storage system to improve the lookup mechanism of the distributed storage system, and metadata of application data is searched for preferentially in a relatively small range, thereby improving the data access speed.

Figure 1:
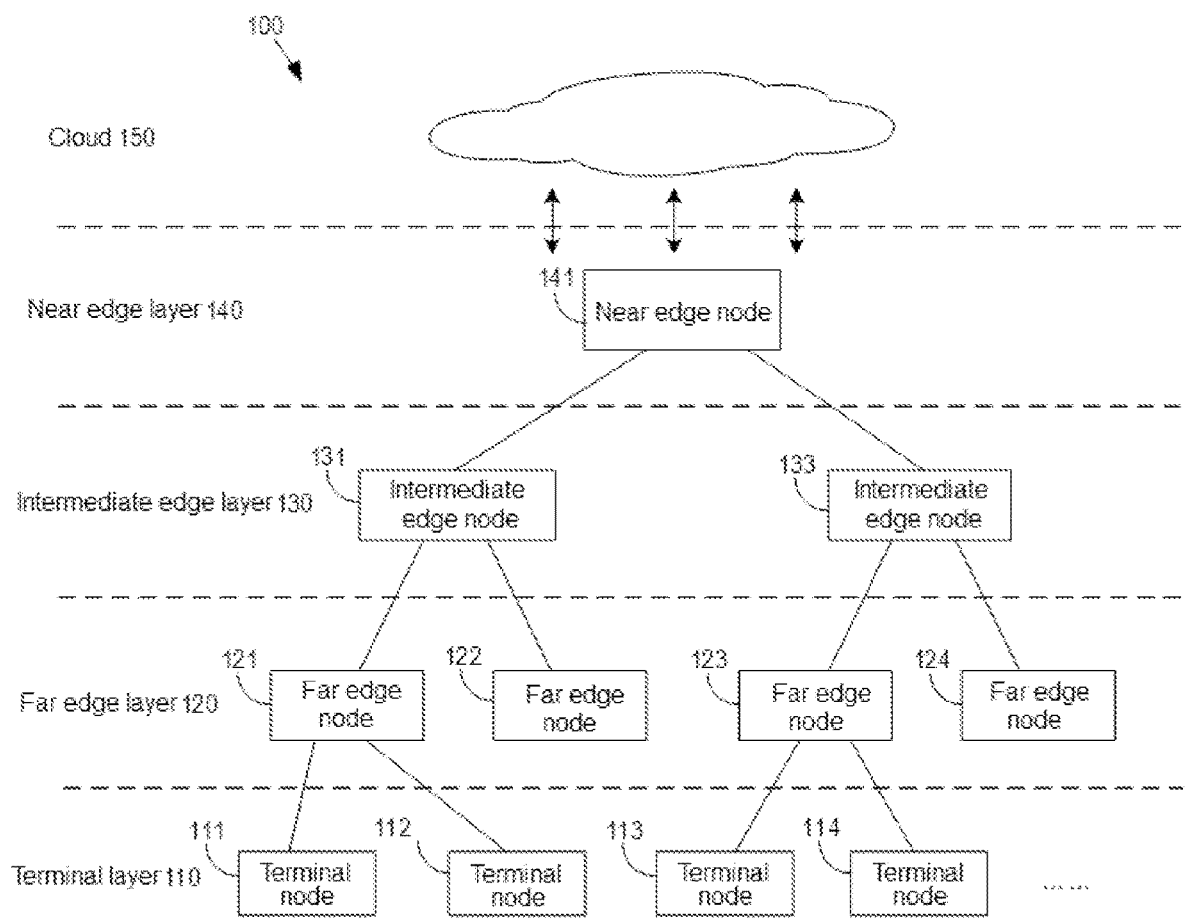
FIG. 1 illustrates a schematic diagram of an example distributed storage system which can implement an embodiment of the present disclosure.

FIG. 1 illustrates a schematic diagram of example distributed storage system 100 which can implement an embodiment of the present disclosure. As shown in FIG. 1, distributed storage system 100 in an edge computing environment can be implemented as a hierarchical structure as a whole, including terminal layer 110, far edge layer 120, intermediate edge layer 130, near edge layer 140, and cloud 150.

Terminal layer 110 generally includes various types of terminal nodes 111, 112, 113, 114, and the like (also referred to as client terminals), such as desktop computers, notebook computers, smart phones, wearable devices, security cameras, and smart cars. Terminal nodes 111 to 114 participate in distributed storage system 100 through a wired or wireless connection according to their geographic locations, network configurations, and the like, so as to be communicatively coupled to each other. For example, terminal node 111 may be a smart phone, which is connected to a corresponding cell according to its geographic location, is connected to the nearest far edge node, and is then switched to another edge node as the location changes. For another example, terminal node 112 may be a smart car, which is connected to a nearby Internet-of-Vehicles edge node according to its location, and is switched to a corresponding nearby Internet-of-Vehicles edge node during driving.

Far edge layer 120 includes far edge nodes 121, 122, 123, and 124 that are deployed to communicate with terminal nodes 111 to 114 of terminal layer 110. The far edge nodes may generally be mobile edge computing (MEC) devices that have more computing resources (such as processor performance, storage capacity, and access speed) than the terminal nodes. For example, far edge devices 121 to 124 may be computing devices that are deployed near a base station and may locally process and store at least a part of data from the terminal nodes with a small delay.

In the hierarchical structure of distributed storage system 100, intermediate edge layer 130 including intermediate edge nodes 131 and 133 is located above far edge layer 120. Intermediate edge nodes 131 and 133 generally have computing devices (for example, small computing clusters) that have more computing resources (such as processor performance, storage capacity, and access speed) than far edge nodes 121 to 124, and may be, through a core network (not shown), connected to each other, connected down to far edge nodes 121 to 124, and connected up to near edge node 141 of near edge layer 140.

Similarly, near edge node 141 located at near edge layer 140 may have more computing resources than intermediate edge nodes 121 to 124, and is connected to cloud 150 through the core network.

Cloud 150 may include multiple server device clusters provided by various cloud service providers and integrated through software and hardware computing, which provide services as a whole.

According to an embodiment of the present disclosure, one or more terminal nodes 111 to 114 may be connected to one of far edge nodes 121 to 124 as service nodes thereof through various wired or wireless networks. For example, as shown in FIG. 1, terminal nodes 111 and 112 are connected to far edge node 121, and terminal nodes 113 and 114 are connected to far edge node 123. It should be understood that this connection may dynamically change over time. For example, terminal node 112 (for example, a smart car) may drive into a coverage range of far edge node 121 and be connected to far edge node 121, and then leave the coverage range and be disconnected. In other words, each of far edge nodes 121 to 124 may serve as the center of all terminal nodes within its coverage range to control the terminal nodes connected to it. Each far edge node and its terminal nodes form a corresponding node set.

As shown in FIG. 1, each of far edge nodes 121 to 124 is connected to a corresponding intermediate edge node. For example, far edge nodes 121 and 122 are connected to intermediate edge node 131, and far edge nodes 123 and 124 are connected to intermediate edge node 133. The intermediate edge nodes may control the far edge nodes at the next level. Similarly, intermediate edge nodes 131 and 133 are connected to near edge node 141. The near edge node may control the intermediate edge nodes located at the next level, and may further control the far edge nodes and the terminal nodes at the further next level. Therefore, in distributed storage system 100 shown in FIG. 1, all the nodes form a hierarchical structure in the form of tree topology.

According to the tree topology shown in FIG. 1, far edge node 121 has terminal nodes 111 and 112 as its child nodes, far edge node 121 is also a child node of intermediate edge node 131, and intermediate edge node 131 is also a child node of near edge node 141. In FIG. 1, terminal node 112 is indirectly connected to intermediate edge node 131 and thus is also regarded as a child node of intermediate edge node 131. Herein, the child nodes refer to direct child nodes and indirect child nodes. For example, the child nodes of intermediate node edge 131 include far edge nodes 121 and 122, and further include child nodes 111 and 112 of far edge node 121. Similarly, the child nodes of near edge node 141 include all the nodes below it, as shown in FIG. 1.

In distributed storage system 100, the nodes each have storage capability and communication capability, and can respond to data access requests from other nodes to establish a communication path with a requesting node so as to transmit the requested data. According to an embodiment of the present disclosure, application data and metadata thereof are stored in distributed storage system 100, and the metadata may at least include a storage location of the application data, a size of the application data, a source of the application data, and the like. According to an embodiment of the present disclosure, a node requesting to access application data may search for metadata of the application data to obtain a storage location of the application data, thereby establishing a communication path with a corresponding node to access the application data. As described above, the data lookup mechanism of existing distributed storage systems is not conducive to efficiently obtaining metadata of application data, resulting in a decrease in performance of the system. Methods for storing data and searching for data according to embodiments of the present disclosure will be described further in detail below with reference to FIG. 2 to FIG. 9 in conjunction with FIG. 1.

Although distributed storage system 100 shown in FIG. 1 is shown as including a specific number of terminal nodes, far edge nodes, intermediate edge nodes, and near edge nodes, those skilled in the art should understand that the number of the nodes of distributed storage system 100 is not limited to this. In addition, although distributed storage system 100 in FIG. 1 is shown as a topological structure shown in the figure, its topological structure is not limited to this. For example, it may be a tree topology that includes more or fewer hierarchies and any other connections.

Figure 2:
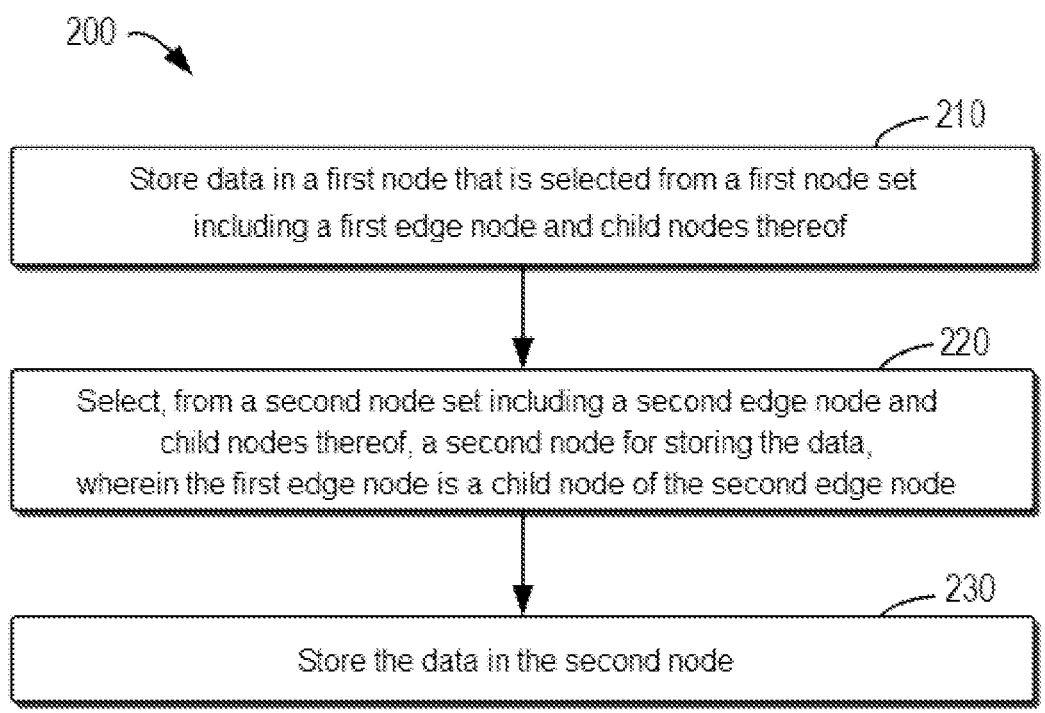
FIG. 2 illustrates a flow chart of a method for storing data according to an embodiment of the present disclosure.

FIG. 2 illustrates a flow chart of method 200 for storing data according to an embodiment of the present disclosure.

At block 210, data is stored in a first node, and the first node is selected from a first node set including a first edge node and child nodes thereof. According to an embodiment of the present disclosure, the data may be metadata of application data generated by a node of distributed storage system 100. For example, terminal node 111 may capture video data, etc. and is expected to upload it to distributed storage system 100. After a storage location of the application data (for example, one or more nodes of the distributed storage system) is determined, the metadata of the application data is generated. The metadata at least includes a storage location of the application data, a size of the application data, a source of the application data, and the like, and will be stored in one or more nodes of distributed storage system 100 based on the embodiment of the present disclosure.

As described above and referring to FIG. 1, as an example only, terminal node 111 that generates data may be a child node of far edge node 121. Therefore, far edge node 121 is determined as the first edge node, and a node is selected from the first node set including far edge node 121 and the child nodes thereof to store the data. In some embodiments, a node for storing the data may be determined in the first node set based on a comparison between hash values of the nodes in the first node set and a hash value of the data. This will be described in detail below with reference to FIG. 3 to FIG. 5.

Figure 3:
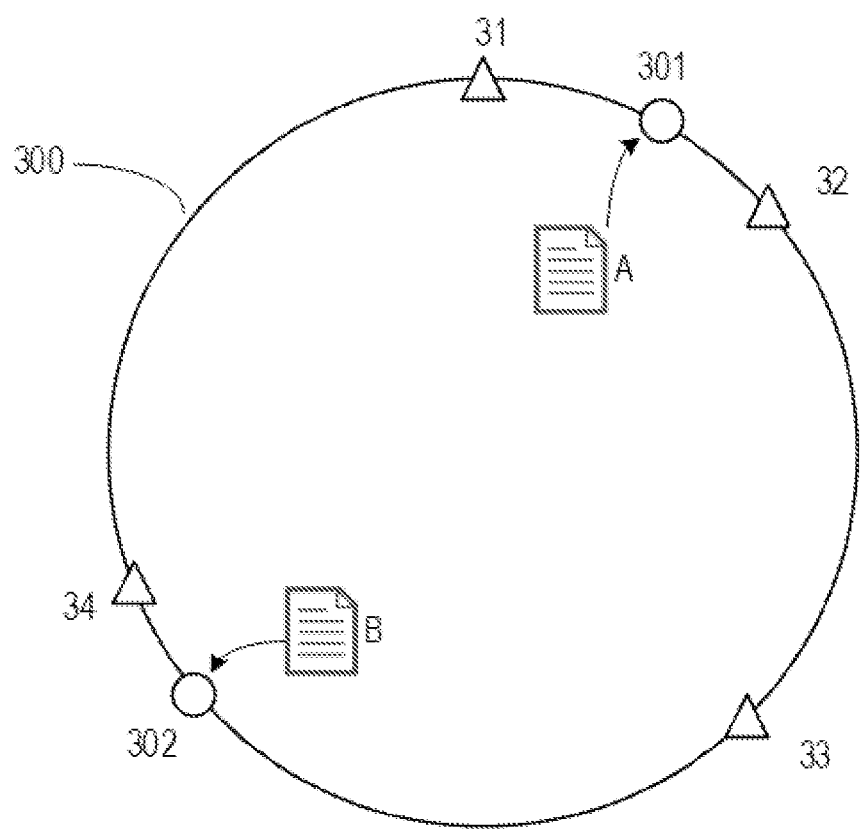
FIG. 3 illustrates a conceptual diagram of selecting a storage node based on a hash ring according to an embodiment of the present disclosure.

FIG. 3 illustrates a conceptual diagram of selecting a storage node based on a hash ring according to an embodiment of the present disclosure. Hash ring 300 refers to a virtual ring to which a hash value space generated through calculation with a hash function is mapped. For example, when a value range of a hash space is 0 to $2^{32}-1$, hash values may be evenly mapped to the virtual ring, so that the hash value 0 is mapped to a 12 o'clock position of the ring, the value of $2^{31}$ is mapped to a 6 o'clock position of the ring, and so on. According to an embodiment of the present disclosure, the same hash function may be used to calculate the hash value of each node in the first node set and the hash value of the data to be stored. For example, a hash value of a node identifier (for example, a node IP address) may be calculated and mapped to hash ring 300. As shown in FIG. 3, as an example only, the nodes in the node set are mapped to locations 31, 32, 33, and 34 of hash ring 300 according to their hash values. Moreover, as an example only, data A and data B are mapped to locations 301 and 302 on hash ring 300 according to their hash values. As shown in FIG. 3, location 301 of data A is between location 31 and location 32. Therefore, according to a predetermined rule, a node corresponding to the first location 32 in a clockwise direction from location 301 may be selected as a node used for storing data A. Similarly, a node corresponding to location 34 may be selected to store data B. From the above, the nodes in the node set are distributed at corresponding locations on the hash ring according to their hash values. Thus, one or more hash values closest to the hash value of the data may be determined by comparing the hash value of the data and the hash values of the nodes, thereby further determining one or more nodes used to store the data. For an illustrative purpose, although FIG. 3 only shows four locations corresponding to nodes, depending on the number of nodes in the node set, the number representing the locations of the nodes on the hash ring may be arbitrary. The following describes multiple hash rings based on a node topological structure in an edge computing environment according to an embodiment of the present disclosure.

Figure 4:
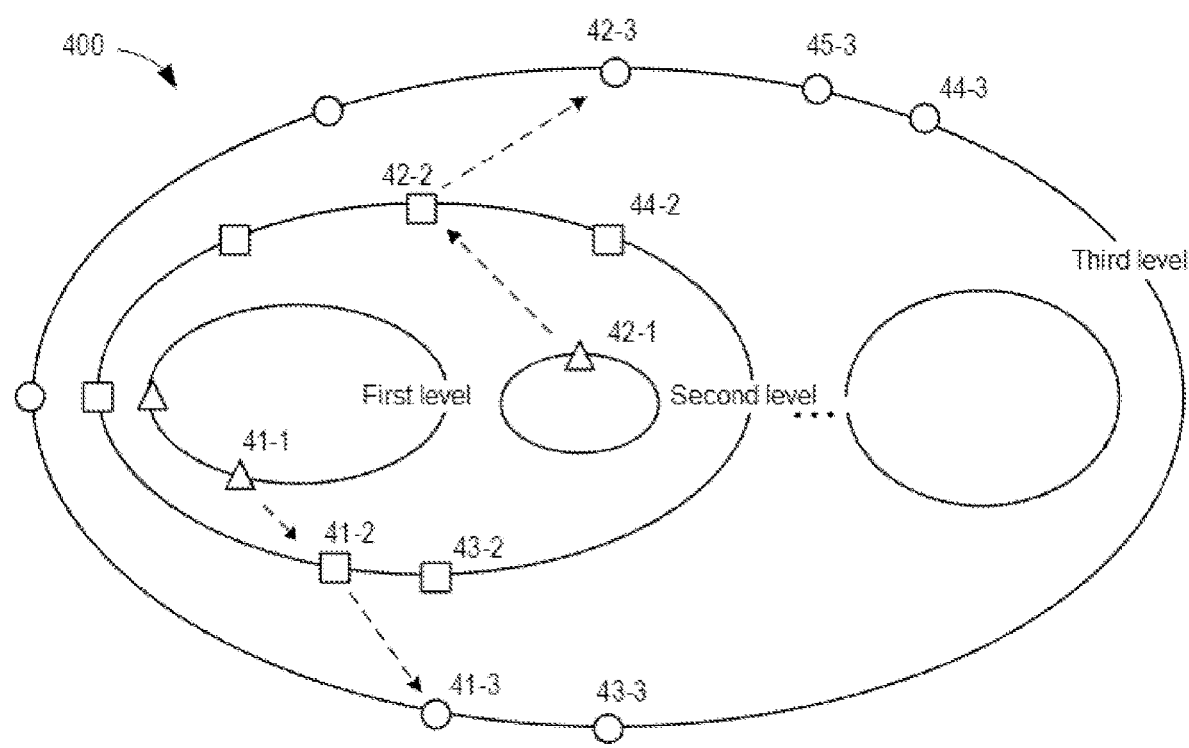
FIG. 4 illustrates a conceptual diagram of multiple hash rings based on a topological structure among nodes of a distributed storage system according to an embodiment of the present disclosure.

FIG. 4 illustrates a conceptual diagram of multiple hash rings 400 based on a node topological structure according to an embodiment of the present disclosure. Three levels of hash rings, namely, a first-level hash ring located in the innermost layer, a second-level hash ring located in the middle, and a third-level hash ring located in the outermost layer are included in FIG. 4. For the sake of clarity, the same or similar shaped marks are used to indicate locations of hash values of nodes on the hash ring at the same level. According to the tree topology in the edge computing environment, each node in distributed storage system 100 is mapped to a corresponding location of one or more of the three hash rings.

According to an embodiment of the present disclosure, the first-level hash ring is formed according to a first node set including a far edge node and child nodes thereof (for example, connected terminal nodes). As an example only, the first node set includes far edge node 121, terminal node 111, and terminal node 112 as shown in FIG. 1. It should be understood that the first-level hash ring may include more terminal nodes, which depends on the number of the terminal nodes connected to the far edge node. As shown in FIG. 4, a certain terminal node may be mapped to location 41-1 on the first-level hash ring according to its hash value. Thus, the nodes of the first node set including the far edge node and the child nodes thereof are all mapped to corresponding locations on the first-level hash ring.

The second-level hash ring is formed according to a second node set including an intermediate edge node and child nodes thereof. More specifically, the second node set includes an intermediate edge node, far edge nodes serving as child nodes of the intermediate edge node, and terminal nodes thereof. As an example only, for intermediate edge node 131 shown in FIG. 1, its child nodes further include far edge nodes 121 and 122 and terminal nodes 111 and 112. It should be understood that, depending on the topological relationship in the distributed storage system, the second-level hash ring may include more or fewer far edge nodes and more or fewer terminal nodes. These nodes are respectively mapped to corresponding locations on the second-level hash ring according to their hash values. For example, as shown in FIG. 4, the same node corresponding to location 41-1 is further mapped to location 41-2 on the second-level hash ring. It should be understood that compared with the first-level hash ring, the second-level hash ring includes more node locations, such as locations 42-2 and 43-2. Specifically, a node corresponding to location 42-1 from another first-level hash ring is mapped to location 42-2 on the second-level hash ring. Thus, the nodes of the second node set including the intermediate edge node and the child nodes thereof are mapped to corresponding locations on the second-level hash ring.

Similarly, the third-level hash ring is formed according to a third node set including a near edge node and child nodes thereof. More specifically, the third node set includes a near edge node, intermediate edge nodes serving as child nodes of the near edge node, far edge nodes, and terminal nodes thereof. As an example only, for near edge node 141 shown in FIG. 1, its child nodes include all the nodes shown in FIG. 1. As shown in FIG. 4, the same node corresponding to locations 41-1 and 41-2 is further mapped to location 41-3 on the third-level hash ring, and a node corresponding to location 42-2 is further mapped to location 42-3 on the third-level hash ring. Thus, the nodes of the third node set including the near edge node and the child nodes thereof are mapped to corresponding locations on the third-level hash ring.

It should be noted that all hash rings may use the same hash function, so that the same nodes are mapped to the same relative locations on these hash rings. For example, locations 41-1, 41-2, and 41-3 of the same node are all located at about 7 o'clock positions on the hash rings, and locations 42-1, 42-2, and 42-3 of the same node are all located at about 12 o'clock positions on the hash rings.

Returning to FIG. 2, at block 220, a second node for storing the data is selected from a second node set including a second edge node and child nodes thereof, and the first edge node is a child node of the second edge node. According to an embodiment of the present disclosure, firstly, the first node for storing the data is selected based on the first-level hash ring formed by the first node set, and the second node for storing the data is selected based on the second-level hash ring formed by the second node set. The second edge node of the second node set is a parent node of the first edge node of the first node set. Therefore, compared with storing the data in the first node set having a smaller range, the data is further stored, according to the topological relationship of the edge nodes, in the second node set having a larger range.

At block 230, the data is stored in the second node. Once the first node is selected from the second node set including the second edge node and the child nodes thereof, the data may be stored in the second node. For example, by establishing a communication connection with the second node, the data is transmitted to the second node.

In some embodiments, method 200 may further include selecting a third node for storing the data from a third-level hash ring formed based on a third node set. Specifically, method 200 may include selecting, from a third node set including a third edge node and child nodes thereof, a third node for storing the data, wherein the second edge node is a child node of the third edge node; and storing the data in the third node.

In some embodiments, the first node may be determined based on a comparison between the nodes in the first node set and the hash value of the data, and the second node may be determined based on a comparison between hash values of the nodes of the second node set and the hash value of the data. Similarly, the third node may be determined based on a comparison between hash values of the nodes of the third node set and the hash value of the data. This will be described in detail below with reference to FIG. 5.

Figure 5:
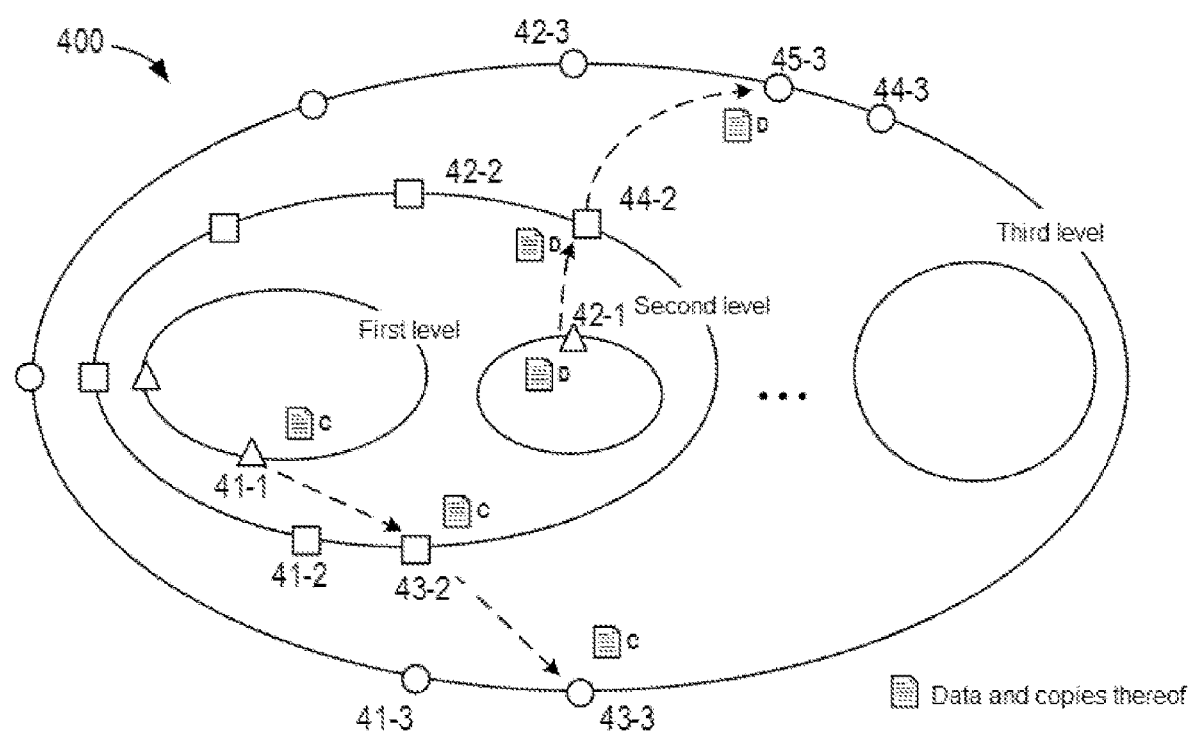
FIG. 5 illustrates a conceptual diagram of selecting a storage node based on the multiple hash rings shown in FIG. 4 according to an embodiment of the present disclosure.

FIG. 5 illustrates a conceptual diagram of selecting a storage node using the multiple hash rings 400 shown in FIG. 4 according to an embodiment of the present disclosure.

Referring to FIG. 5, according to a hash value of data C, data C is mapped to a certain location on the first-level hash ring. In such case, location 41-1 is the location of the nearest node (for example, the first node location in the clockwise direction). Therefore, in the first node set corresponding to the first-level hash ring, a node corresponding to location 41-1 is selected as the first node for storing data C. Once the first node is selected from the first node set including the first edge node and the child nodes thereof, the data may be stored in the determined first node.

Then, according to an embodiment of the present disclosure, the second node may also be selected from the second-level hash ring to store data. As shown in the figure, location 43-2 on the second-level hash ring is closer to data C than location 41-2, and therefore, it replaces location 41-2 and becomes the location closest to the hash value of data C. Thus, in the second node set, a node corresponding to location 43-2 is selected as the second node for storing data C. Correspondingly, a copy of data C may be sent to the node and stored. Similarly, in the third node set corresponding to the third-level hash ring, a node corresponding to location 43-3 may be selected as the node for storing data C. As shown in the figure, locations 43-2 and 43-3 represent the same hash value, and both belong to the same physical node, so that repeated storage of data may be omitted.

As another example, according to a hash value of data D, data D is mapped to a certain location on the first-level hash ring. In such case, location 42-1 is the location closest to data D. Therefore, in the first node set corresponding to the first-level hash ring, a node corresponding to location 42-1 is selected as the first node for storing data D. Then, similarly, by comparing with the hash value of data D, a node corresponding to location 44-2 in the second node set is selected as the second node for storing data D, and similarly, in the third node set, a node corresponding to location 45-3 on the third-level hash ring is selected as the third node for storing data D. Therefore, a copy of data D is sent to the nodes corresponding to locations 44-2 and 45-3 and stored. For data D, locations 42-1, 44-2, and 45-3 may represent hash values different from each other and belong to different physical nodes. Therefore, copies of data D are respectively sent to these nodes and stored.

According to method 200 of the embodiment of the present disclosure, the data is not stored in a distributed mode on a global scale, but first stored in a smaller range, and then expanded to a larger range, so that the time required for searching for the data can be reduced, and data access efficiency can be improved.

In some cases, the nodes, especially the terminal nodes, dynamically participate in or are disconnected from the distributed storage system, so that the data stored by the nodes may be backed up to higher-level nodes periodically or when a specific event occurs (for example, input is performed by an administrator of the distributed storage system), so as to achieve data persistence and enhance data availability. For example, the data stored at terminal nodes 111 and 112 may be backed up to far edge node 121 with a longer lifetime and stronger performance. In some embodiments, far edge node 121 may further back up the data it stores to intermediate edge node 131 with better performance, or even to near edge node 141. Thus, data such as data of the distributed hash table not only is stored in node sets having different ranges in a distributed mode, but also is backed up in a centralized mode to a central node having richer resources in each node set, thereby improving data access efficiency while ensuring data availability.

In addition, when the node selected from a node set does not have enough capacity to store the data, such as insufficient storage capacity and high network delay, the data may be transmitted to the central node of the node set. In some embodiments, method 200 may further include: in response to a failure in storing the data to the first node, storing the data in the first edge node (for example, a far edge node), and in response to a failure in storing the data in the second node, storing the data in the second edge node (for example, an intermediate edge node).

According to an embodiment of the present disclosure, the node for storing data may store data in association with a hash value thereof, so that corresponding data may be quickly obtained through the hash value of the data during searching.

According to an embodiment of the present disclosure, a method for searching for the data stored as described above is provided. When a user wants to access application data in the distributed storage system, metadata of the application data may be more quickly found to at least obtain a storage location of the application data.

According to the method described above with reference to FIG. 2 to FIG. 5, data such as the metadata may be stored in at least one node in the first node set, and in at least one node in the second node set and the third node set which have a larger number of nodes. Based on the above process of storing data, a corresponding process of searching for data is also provided. When a user searches for a certain piece of data, the distributed storage system based on edge computing may first search the lowest-level first node set for the data, and when the searching fails, the searching is expanded to the second node set. If it fails again, the searching may be expanded to the third node set. The process of searching for data in the distributed storage system according to an embodiment of the present disclosure will be described below in detail with reference to FIG. 6 to FIG. 8.

Figure 6:
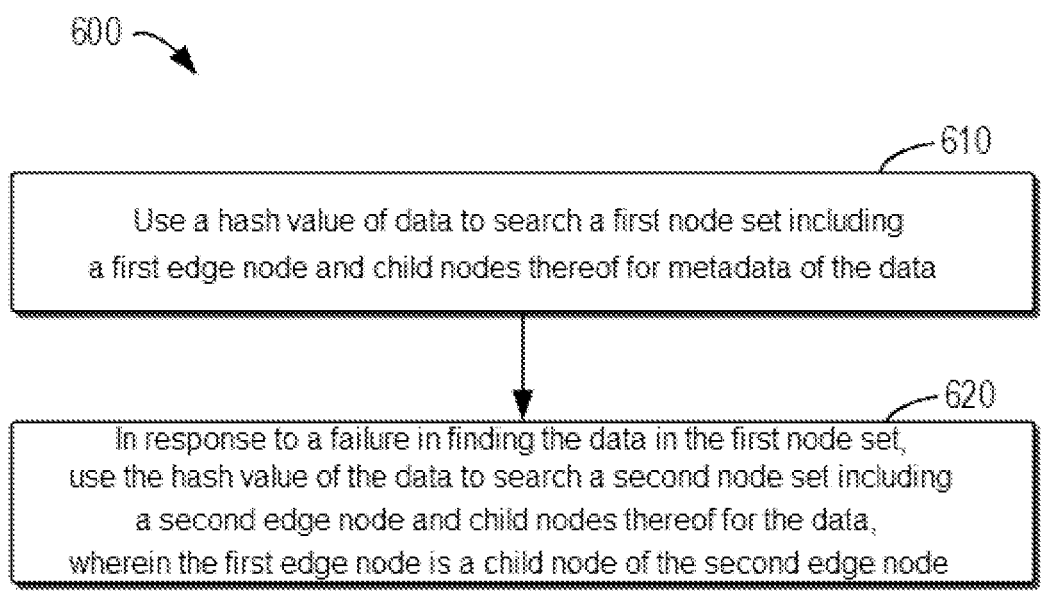
FIG. 6 illustrates a flow chart of a method for searching for data according to an embodiment of the present disclosure.

FIG. 6 illustrates a flow chart of method 600 for searching for data according to an embodiment of the present disclosure. At block 610, a hash value of the data is used to search for the data in a first node set including a first edge node and child nodes thereof. The data may be metadata of application data, for example, including a storage location of the application data.

It should be understood that the number of nodes in the node set may be quite large and dynamically changing, so it is impractical for each node to store and dynamically update information of other nodes. In some cases, the nodes in the node set only know existence of a part of the nodes (for example, nodes in a range of IP addresses) in the set, and store hash values and addresses of other nodes that they know as entries in a routing table in association. In other words, the nodes may maintain a routing table about the first node set. A process of searching for data in a node set will be described in detail with reference to FIG. 7.

Figure 7:
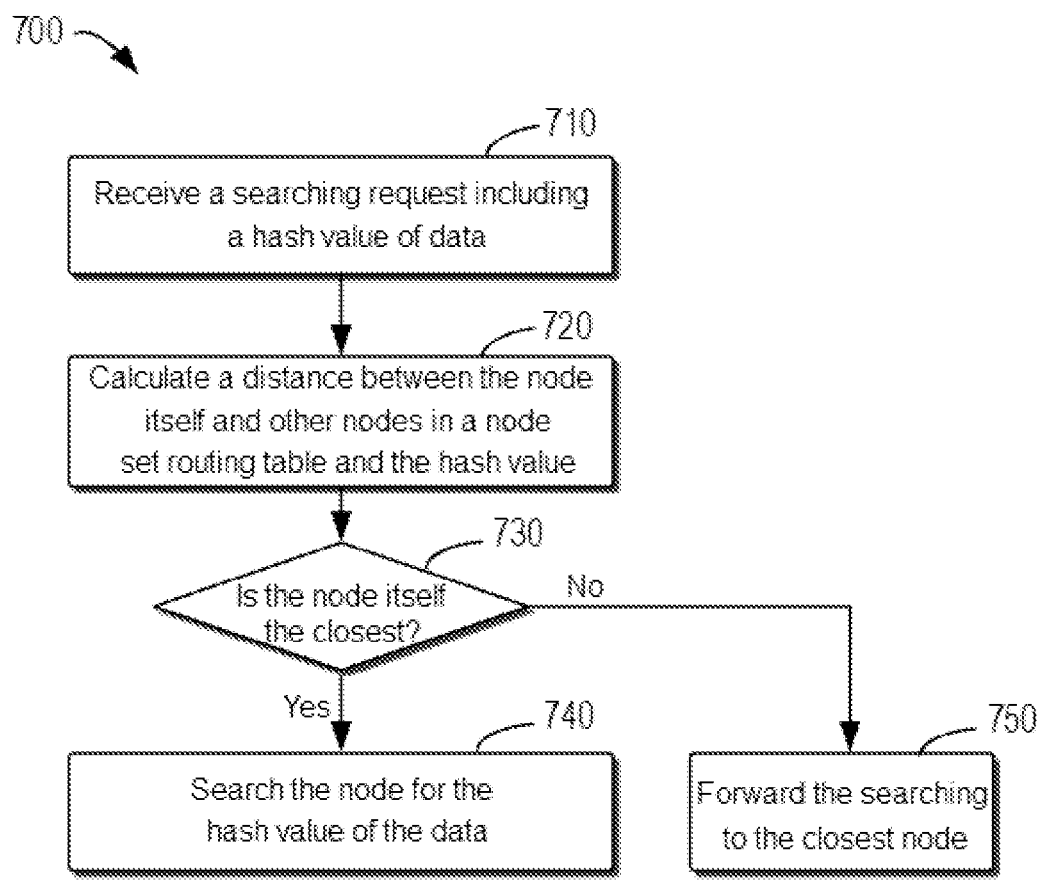
FIG. 7 illustrates a flow chart of a method for searching for data in a node set according to an embodiment of the present disclosure.

FIG. 7 illustrates a flow chart of method 700 for searching for data in a node set according to an embodiment of the present disclosure. At block 710, a searching request including a hash value of the data is received. For example, one or more of child nodes of a first edge node may receive a searching request, and the searching request may include a hash value of metadata of application data that is to be accessed. A node storing the metadata in the first node set may be located through the hash value of the metadata. In some embodiments, the first node in the first node set may be determined based on a comparison between the nodes in the first node set and the hash value of the data.

At block 720, the node that receives the searching request may calculate a distance between its own hash value and a hash value carried in the searching request, and calculate a distance between the hash value of another node it knows and the hash value of the data. As described above with reference to FIG. 2 to FIG. 5, nodes are mapped to the hash ring according to their hash values, and by comparing the hash value of the data with the nodes in the node set, the node of which the hash value is closest to the hash value of the data is selected to store the data. Therefore, when searching for data, a similar method is used to determine the node where the data is stored.

At block 730, it is determined whether the node itself is the closest node. If the node is not the closest node, at block 750, the searching is forwarded to the node closest to the hash value of the data in the routing table. According to an embodiment of the present disclosure, the closest node may be located iteratively by forwarding the searching request.

If it is determined at block 730 that the node is the closest node, the method proceeds to block 740, and the node is searched for the hash value of the data. If the hash value of the data is found, it means that the data is obtained and the searching is finished. If the hash value of the data cannot be found in the current node, it means that the data cannot be found in the node closest to the hash value of the data. In this case, an edge node (for example, a far edge node) that serves as a central node of the first node set can be searched for the data. As described above, the central node of the node set may receive data periodically or based on events (for example, input from an administrator of the distributed storage system) to ensure data availability. If the data cannot be found in the central node, it can be considered that finding the data in the first node fails.

Returning to FIG. 6, at block 620, in response to a failure in finding the data in the first node set, the hash value of the data is used to search a second node set including a second edge node and child nodes thereof for the data, and the first edge node is a child node of the second edge node. According to the topology among the edge nodes, the second node set includes more nodes than the first node set, and the data may be stored in other nodes which are in the second node set but not in the first node set. Similarly, each node can maintain a routing table about the second node set, in which entries store hash values and addresses of other nodes its node knows in association.

Figure 8:
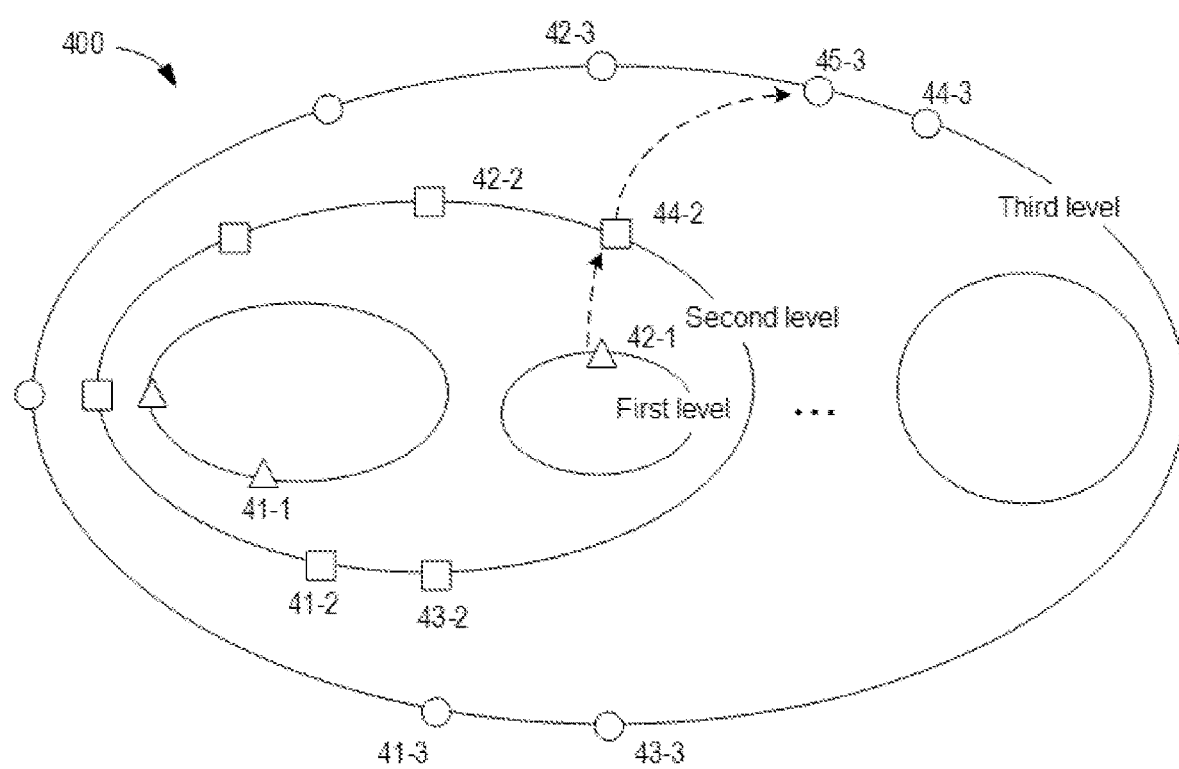
FIG. 8 illustrates a conceptual diagram of searching for data using the multiple hash rings shown in FIG. 4 according to an embodiment of the present disclosure.

A process of switching from searching for data in the first node set to searching for data in the second node set will be described with reference to FIG. 8. FIG. 8 illustrates a conceptual diagram of searching for data using the multiple hash rings 400 shown in FIG. 4 according to an embodiment of the present disclosure.

As an example, when a node corresponding to location 42-1 on the first-level hash ring fails to find the data in the first node set (this means that the hash value of the node in the first node set is closest to the data), a routing table thereof about the second node set may be used to search for the data. Specifically, similar to method 700 shown in FIG. 7, a distance between hash values of other nodes in the routing table of the second node set and the hash value of the data is calculated at the node corresponding to location 42-1, and a node closest to the hash value of the data is determined among the node itself and other nodes. In other words, the node that is closest to the hash value of the data and may store the data is located based on the second-level hash ring. Then, the searching may be forwarded to the determined closest node, so that the closest node on the second-level hash ring is located in an iterative manner, and the closest node is searched for the hash value of the data. For example, through a node corresponding to location 42-1 on the first-level hash ring, the searching is forwarded to the second-level hash ring, and a node corresponding to location 44-2 is determined as the closest node in the second node set. Correspondingly, the node corresponding to location 44-2 may be searched for the hash value of the data. If the hash value of the data is found, the searching is finished. If the hash value of the data cannot be found in the current node, it means that the data cannot be found in the node closest to the hash value of the data. In this case, an edge node (for example, an intermediate edge node) that serves as a central node of the second node set can be searched for the data. If the data cannot be found in the central node, it can be considered that finding the data in the second node set fails.

In some embodiments, searching for data in the second node set may be further switched to searching for data in a third node set. The third node set may include a third edge node and child nodes thereof, and the second edge node is a child node of the third edge node. For example, the third edge node may be a near edge node at a level above the second edge node. Referring to FIG. 8, through a node corresponding to location 44-2 on the second-level hash ring, the searching request is forwarded to the third-level hash ring, and a node corresponding to location 45-3 is determined as the closest node in the third node set. Through the above similar process, the data is searched for on the third-level hash ring.

According to an embodiment of the present disclosure, the searching is gradually implemented in ranges from small to large, rather than directly implemented in a global range, and data searching and data access in most applications occur in a local range with low communication latency. Therefore, the method for searching for data according to an embodiment of the present disclosure can reduce the number of hops required for searching and the average delay required for each hop, thereby significantly reducing the searching time and improving data access efficiency.

Figure 9:
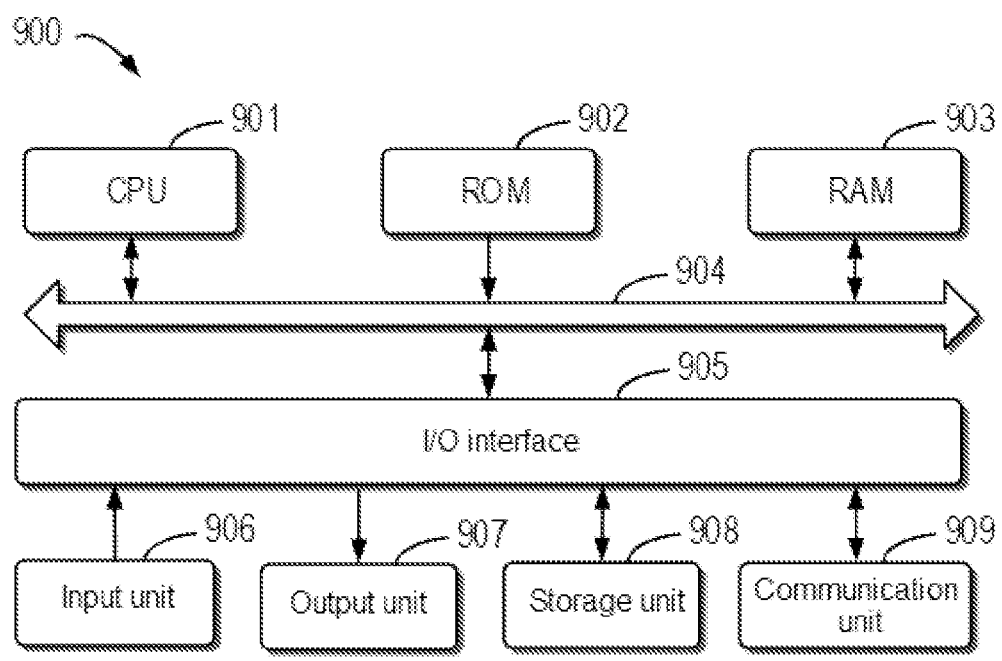
FIG. 9 illustrates a schematic block diagram of an example device that can be used to implement an embodiment of the present disclosure.

FIG. 9 shows a schematic block diagram of example device 900 that can be configured to implement an embodiment of the present disclosure. For example, a node or other portion of a distributed storage system according to an embodiment of the present disclosure may be implemented by device 900. As shown in the figure, device 900 includes central processing unit (CPU) 901 that may perform various appropriate actions and processing according to computer program instructions stored in read-only memory (ROM) 902 or computer program instructions loaded from storage unit 908 into random access memory (RAM) 903. In RAM 903, various programs and data required for the operation of device 900 may also be stored. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, for example, method 200, method 600 and/or method 700, may be performed by CPU 901. For example, in some embodiments, method 200, method 600 and/or method 700 may be implemented as a computer software program that is tangibly included in a machine-readable medium such as storage unit 908. In some embodiments, part or all of the computer program may be loaded and/or installed onto device 900 via ROM 902 and/or communication unit 909. When the computer program is loaded onto RAM 903 and executed by CPU 901, one or more actions of method 200, method 600 and/or method 700 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages. The programming languages include an object-oriented programming language, such as Smalltalk, C++, and the like, and a conventional procedural programming language, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, and to otherwise enable persons of ordinary skill in the art to understand the implementations disclosed herein.

What is claimed is:

1. A method, comprising:
    storing data in a first node, the first node being selected from a first node set comprising a first edge node and child nodes thereof, the first node set comprising a first ring of nodes at a first level in an arrangement of multiple hash rings;
    selecting, from a second node set comprising a second edge node and child nodes thereof, a second node for storing the data, the first edge node being a child node of the second edge node; and
    storing the data in the second node;
    the method further comprising:
    using a hash value of the data to search the first node set for the data; and
    in response to a failure in finding the data in the first node set, using the hash value of the data to search for the data in the second node set;
    wherein the second node set comprises a second ring of nodes at a second level in the arrangement of multiple hash rings, the first ring of nodes at the first level being arranged within the second ring of nodes at the second level in the arrangement of multiple hash rings;
    wherein the first node is determined based on a comparison between hash values of nodes in the first node set and the hash value of the data;
    wherein the second node is determined based on a comparison between hash values of nodes of the second node set and the hash value of the data; and wherein the first ring of nodes at the first level comprises at least one node corresponding to a far edge node based on distance relative to a specified cloud and the second ring of nodes at the second level comprises at least one node corresponding to a near edge node based on distance relative to the specified cloud, the near edge node being closer to the specified cloud than the far edge node.

2. The method according to claim 1, further comprising:
selecting, from a third node set comprising a third edge node and child nodes thereof, a third node for storing the data, the second edge node being a child node of the third edge node; and
storing the data in the third node.

3. The method according to claim 1, further comprising:
in response to a failure in storing the data in the first node, storing the data in the first edge node; and
in response to a failure in storing the data in the second node, storing the data in the second edge node.

4. The method according to claim 1, wherein the data is metadata of another piece of data and at least comprises a storage location of the other piece of data.

5. The method according to claim 1, wherein the child nodes of the first edge node are terminal devices.

6. The method according to claim 1, wherein the data and a hash value thereof are stored in association with one another.

7. A method, comprising:
using a hash value of the data to search a first node set comprising a first edge node and child nodes thereof for the data, the first node set comprising a first ring of nodes at a first level in an arrangement of multiple hash rings; and
in response to a failure in finding the data in the first node set, using the hash value of the data to search for the data in a second node set comprising a second edge node and child nodes thereof, the first edge node being a child node of the second edge node;
wherein the second node set comprises a second ring of nodes at a second level in the arrangement of multiple hash rings, the first ring of nodes at the first level being arranged within the second ring of nodes at the second level in the arrangement of multiple hash rings;
wherein searching the first node set for the data comprises:
determining a first node in the first node set based on a comparison between hash values of nodes in the first node set and the hash value of the data; and
using the hash value of the data to search the first node for the data; and
wherein the first ring of nodes at the first level comprises at least one node corresponding to a far edge node based on distance relative to a specified cloud and the second ring of nodes at the second level comprises at least one node corresponding to a near edge node based on distance relative to the specified cloud, the near edge node being closer to the specified cloud than the far edge node.

8. The method according to claim 7, further comprising:
receiving the searching from one of the child nodes of the first edge node.

9. The method according to claim 7, further comprising:
in response to a failure in finding the data in the first node, determining a second node in the second node set via the first node and based on a comparison between nodes in the second node set and the hash value; and
searching the second node for the data.

10. The method according to claim 7, further comprising:
in response to a failure in finding the data in the first node, searching the first edge node in the first node set for the data.

11. The method according to claim 7, wherein the data is metadata of another piece of data and at least comprises a storage location of the other piece of data.

12. An electronic device, comprising:
at least one processing unit; and
at least one memory that is coupled to the at least one processing unit and stores instructions for execution by the at least one processing unit, wherein the instructions, when executed by the at least one processing unit, cause the electronic device to perform a method for storing data, the method comprising:
storing data in a first node, the first node being selected from a first node set comprising a first edge node and child nodes thereof, the first node set comprising a first ring of nodes at a first level in an arrangement of multiple hash rings;
selecting, from a second node set comprising a second edge node and child nodes thereof, a second node for storing the data, the first edge node being a child node of the second edge node; and
storing the data in the second node;
the method further comprising:
using a hash value of the data to search the first node set for the data; and
in response to a failure in finding the data in the first node set, using the hash value of the data to search for the data in the second node set;
wherein the second node set comprises a second ring of nodes at a second level in the arrangement of multiple hash rings, the first ring of nodes at the first level being arranged within the second ring of nodes at the second level in the arrangement of multiple hash rings;
wherein the first node is determined based on a comparison between hash values of nodes in the first node set and the hash value of the data;
wherein the second node is determined based on a comparison between hash values of nodes of the second node set and the hash value of the data; and
wherein the first ring of nodes at the first level comprises at least one node corresponding to a far edge node based on distance relative to a specified cloud and the second ring of nodes at the second level comprises at least one node corresponding to a near edge node based on distance relative to the specified cloud, the near edge node being closer to the specified cloud than the far edge node.

13. The electronic device according to claim 12, further comprising:
selecting, from a third node set comprising a third edge node and child nodes thereof, a third node for storing the data, the second edge node being a child node of the third edge node; and
storing the data in the third node.

14. The electronic device according to claim 12, further comprising:
in response to a failure in storing the data in the first node, storing the data in the first edge node; and
in response to a failure in storing the data in the second node, storing the data in the second edge node.

15. The electronic device according to claim 12, wherein the data is metadata of another piece of data and at least comprises a storage location of the other piece of data.

16. A computer program product tangibly stored in a non-transitory computer-readable medium and comprising machine-executable instructions that, when executed by an electronic device, cause the electronic device to perform the method according to claim 1.

17. The computer program product according to claim 16, wherein the data is metadata of another piece of data and at least comprises a storage location of the other piece of data.

18. A computer program product tangibly stored in a non-transitory computer-readable medium and comprising machine-executable instructions that, when executed by an electronic device, cause the electronic device to perform the method according to claim 7.

19. The computer program product according to claim 18, wherein in response to a failure in finding the data in the first node, searching the first edge node in the first node set for the data.

20. The computer program product according to claim 18, wherein the data is metadata of another piece of data and at least comprises a storage location of the other piece of data.

\* \* \* \* \*